United States Patent
Martin et al.

(10) Patent No.: US 8,513,321 B2
(45) Date of Patent: *Aug. 20, 2013

(54) DUAL CURE COATING COMPOSITIONS, METHODS OF COATING A SUBSTRATE, AND RELATED COATED SUBSTRATES

(75) Inventors: David C. Martin, Bethel Park, PA (US); Brian K. Rearick, Allison Park, PA (US); Christina A. Winters, Freeport, PA (US); Mary Ann Fuhry, Butler, PA (US); Cynthia Kutchko, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/940,317

(22) Filed: Nov. 5, 2010

(65) Prior Publication Data

US 2012/0115977 A1 May 10, 2012

(51) Int. Cl.
  C08F 2/52 (2006.01)
  C08F 2/42 (2006.01)
  C08J 3/28 (2006.01)

(52) U.S. Cl.
  USPC .......... 522/96; 522/6; 522/7; 522/90; 522/92; 522/97; 522/109; 522/110; 522/111; 522/112; 522/113; 522/117; 522/182; 522/122; 522/134; 522/137; 522/143; 522/144; 522/153; 522/151; 522/152; 522/173; 522/178

(58) Field of Classification Search
  USPC ............. 522/90, 96, 154, 152, 153, 173, 174, 522/178, 97, 92, 109, 110, 111, 112, 113, 522/116, 117, 120, 121, 134, 114, 136, 137, 522/138, 143, 151, 182, 6, 7
  See application file for complete search history.

(56) References Cited

U.S. PATENT DOCUMENTS

| | | | |
|---|---|---|---|
| 3,020,255 A | 2/1962 | Magrane et al. | |
| 4,025,407 A | 5/1977 | Chang et al. | |
| 4,072,770 A * | 2/1978 | Ting | 427/494 |
| 4,266,053 A | 5/1981 | Imanaka et al. | |
| 4,293,678 A | 10/1981 | Carter et al. | |
| 4,680,204 A | 7/1987 | Das et al. | |
| 4,847,336 A | 7/1989 | Gerhardt | |
| 4,908,274 A | 3/1990 | Jachmann et al. | |
| 4,963,438 A | 10/1990 | Weitemeyer et al. | |
| 4,978,726 A | 12/1990 | Dohler et al. | |
| 5,206,295 A | 4/1993 | Harper et al. | |
| 5,248,789 A | 9/1993 | Wolff | |
| 5,283,126 A | 2/1994 | Rasmussen et al. | |
| 5,296,571 A | 3/1994 | Hori et al. | |
| 5,407,818 A | 4/1995 | von Gentzkow et al. | |
| 5,447,998 A | 9/1995 | Grady et al. | |
| 5,468,801 A | 11/1995 | Antonelli et al. | |
| 5,494,815 A | 2/1996 | von Gentzkow et al. | |
| 5,552,506 A | 9/1996 | Ebbrecht et al. | |
| 5,672,393 A | 9/1997 | Bachmann et al. | |
| 5,679,721 A * | 10/1997 | Courtoy et al. | 522/95 |
| 5,719,251 A | 2/1998 | Wilczek et al. | |
| 5,899,917 A | 5/1999 | Edwards et al. | |
| 5,906,788 A | 5/1999 | Boeckler | |
| 5,977,282 A | 11/1999 | Ebbrecht et al. | |
| 6,099,123 A | 8/2000 | Engardio et al. | |
| 6,197,844 B1 * | 3/2001 | Hamrock et al. | 522/167 |
| 6,203,911 B1 | 3/2001 | Weberg et al. | |
| 6,211,322 B1 | 4/2001 | Dohler et al. | |
| 6,268,404 B1 | 7/2001 | Dohler et al. | |
| 6,290,881 B1 | 9/2001 | Krohn | |
| 6,326,059 B1 | 12/2001 | Lewin et al. | |
| 6,350,523 B1 | 2/2002 | Schwalm | |
| 6,399,689 B1 | 6/2002 | Scarlette | |
| 6,478,990 B1 | 11/2002 | Powers et al. | |
| 6,541,078 B2 | 4/2003 | Rekowski et al. | |
| 6,592,998 B2 | 7/2003 | Anderson et al. | |
| 6,592,999 B1 | 7/2003 | Anderson et al. | |
| 6,593,417 B1 | 7/2003 | Anderson et al. | |
| 6,610,777 B1 | 8/2003 | Anderson et al. | |
| 6,623,791 B2 | 9/2003 | Sadvary et al. | |
| 6,641,923 B2 | 11/2003 | Sadvary et al. | |
| 6,784,223 B2 | 8/2004 | Krohn | |
| 6,806,024 B1 | 10/2004 | Kura et al. | |
| 6,815,501 B2 | 11/2004 | Flosbach et al. | |

(Continued)

FOREIGN PATENT DOCUMENTS

| | | |
|---|---|---|
| EP | 0956280 | 10/2002 |
| EP | 1635220 | 3/2006 |

(Continued)

OTHER PUBLICATIONS

Sartomer: Oligomer Selection Giude. (1997). [oline]. [Retrieved online Mar. 30, 2012]. Retrieved from the interent: <URL:http://www.univareurope.com/uploads/documents/uk/Sartomer_oligomer.pdf>.*

Photoinitiators for UV Curing: Key Product Selection Guide. Ciba Specialty Chemicals. (2003). online. [retrieved online of Mar. 30, 2012]. Retreived from Internet: <URL:http://forums.reprap.org/file.php?184,file=30,filename=Photoinitiator_UVCURING_March05.pdf>.*

Industrial Photoinitiators: A Technical Guide. W . Arthur Green, CRC Press 2010, pp. 75-114.*

Darocur 1173: Ciba Specialty Chemicals (2001). online. [Retrieved online Mar. 30, 2012]. Retrived from Internet <URL:http://people.rit.edu/deeemc/courses/0305-676/reference/Imprint/darocur_1173-2.pdf>.*

(Continued)

Primary Examiner — Sanza McClendon
(74) Attorney, Agent, or Firm — Christine W. Trebilcock

(57) ABSTRACT

Disclosed herein are dual cure coating compositions that include (a) a melamine-group containing polyethylenically unsaturated compound and (b) an acrylate-containing compound different from (a), wherein the acrylate-containing compound is present at a level sufficient to provide a cured coating layer having a glass transition temperature of 100° C. or below and a crosslink density of 20.0 mmoles/cc or below. Also disclosed are related multi-component composite coatings, coated substrates, and methods for coating a substrate.

14 Claims, No Drawings

(56) References Cited

U.S. PATENT DOCUMENTS

| | | | |
|---|---|---|---|
| 6,833,186 | B2 | 12/2004 | Perrine et al. |
| 6,908,644 | B2 * | 6/2005 | Weingartz ............... 427/515 |
| 7,041,708 | B2 | 5/2006 | Le-Khac et al. |
| 7,053,149 | B2 | 5/2006 | Anderson et al. |
| 7,087,696 | B2 | 8/2006 | Wiesendanger et al. |
| 7,141,618 | B2 | 11/2006 | Schneider et al. |
| 7,147,801 | B2 | 12/2006 | Kozee et al. |
| 7,268,172 | B2 | 9/2007 | Bach et al. |
| 7,276,543 | B2 * | 10/2007 | Bishop et al. ............... 522/96 |
| 7,329,468 | B2 | 2/2008 | Anderson et al. |
| 7,374,852 | B2 | 5/2008 | Yon et al. |
| 7,399,793 | B2 | 7/2008 | Braun et al. |
| 7,468,330 | B2 | 12/2008 | Allen et al. |
| 7,498,362 | B2 | 3/2009 | Ramsey |
| 7,629,400 | B2 | 12/2009 | Hyman |
| 7,632,547 | B2 | 12/2009 | Weingartz |
| 7,704,573 | B2 | 4/2010 | Itami et al. |
| 7,709,544 | B2 | 5/2010 | Doyle et al. |
| 7,794,844 | B2 | 9/2010 | Dean et al. |
| 2001/0037008 | A1 | 11/2001 | Sherman et al. |
| 2002/0132871 | A1 | 9/2002 | Colton et al. |
| 2003/0031804 | A1 | 2/2003 | Rekowski et al. |
| 2003/0183960 | A1 | 10/2003 | Buazza et al. |
| 2003/0191272 | A1 * | 10/2003 | Flosbach et al. ............ 528/44 |
| 2004/0030038 | A1 | 2/2004 | Woltering et al. |
| 2004/0151843 | A1 | 8/2004 | Weingartz |
| 2004/0185296 | A1 | 9/2004 | Mazzanti |
| 2004/0191498 | A1 | 9/2004 | White et al. |
| 2004/0214017 | A1 | 10/2004 | Uhlianuk et al. |
| 2004/0214911 | A1 | 10/2004 | DeSaw et al. |
| 2004/0225057 | A1 | 11/2004 | Anderson et al. |
| 2005/0074617 | A1 | 4/2005 | Lin et al. |
| 2005/0079293 | A1 | 4/2005 | Baumgart et al. |
| 2005/0084613 | A1 | 4/2005 | wang et al. |
| 2005/0095266 | A1 | 5/2005 | Perichaud et al. |
| 2005/0096427 | A1 | 5/2005 | Odajima et al. |
| 2005/0112286 | A1 | 5/2005 | Nguyen et al. |
| 2005/0119422 | A1 | 6/2005 | Baumgart et al. |
| 2005/0129859 | A1 | 6/2005 | Misev et al. |
| 2005/0261391 | A1 | 11/2005 | Narayan-Sarathy et al. |
| 2005/0287300 | A1 | 12/2005 | Herrwerth et al. |
| 2006/0041047 | A1 | 2/2006 | Ramsey |
| 2006/0047036 | A1 | 3/2006 | Lin |
| 2006/0069233 | A1 | 3/2006 | Drysdale et al. |
| 2006/0128873 | A1 | 6/2006 | Drysdale et al. |
| 2006/0228552 | A1 | 10/2006 | Schwantes et al. |
| 2006/0286302 | A1 | 12/2006 | Ma et al. |
| 2006/0287437 | A1 | 12/2006 | Ma et al. |
| 2007/0026509 | A1 | 2/2007 | Rogers et al. |
| 2007/0048441 | A1 | 3/2007 | Braun et al. |
| 2007/0172668 | A1 | 7/2007 | Gruber et al. |
| 2007/0185275 | A1 | 8/2007 | Molendi |
| 2007/0265367 | A1 | 11/2007 | Le-Khac et al. |
| 2008/0050534 | A1 | 2/2008 | Louwet et al. |
| 2008/0066773 | A1 | 3/2008 | Anderson et al. |
| 2008/0090930 | A1 | 4/2008 | Madhusoodhanan et al. |
| 2008/0090932 | A1 | 4/2008 | Madhusoodhanan et al. |
| 2008/0166871 | A1 | 7/2008 | Allen et al. |
| 2008/0171156 | A1 | 7/2008 | Olijve et al. |
| 2008/0182043 | A1 | 7/2008 | van Baak et al. |
| 2008/0182914 | A1 | 7/2008 | Itami et al. |
| 2008/0193536 | A1 | 8/2008 | Khademhosseini et al. |
| 2008/0193735 | A1 | 8/2008 | Hessing et al. |
| 2008/0200582 | A1 | 8/2008 | Craciun et al. |
| 2008/0287622 | A1 | 11/2008 | Johnson et al. |
| 2009/0011486 | A1 | 1/2009 | Bettinger et al. |
| 2009/0029149 | A1 | 1/2009 | Kim et al. |
| 2009/0047256 | A1 | 2/2009 | Bettinger et al. |
| 2009/0082514 | A1 | 3/2009 | Dean |
| 2009/0099277 | A1 | 4/2009 | Nagvekar et al. |
| 2009/0104136 | A1 | 4/2009 | Anderson et al. |
| 2009/0145452 | A1 | 6/2009 | Anderson et al. |
| 2009/0159442 | A1 | 6/2009 | Collier et al. |
| 2009/0176907 | A1 | 7/2009 | Subramanian et al. |
| 2009/0202813 | A1 | 8/2009 | Itami et al. |
| 2009/0206162 | A1 | 8/2009 | DeCremer et al. |
| 2009/0220436 | A1 | 9/2009 | Anderson et al. |
| 2009/0274877 | A1 | 11/2009 | Chan et al. |
| 2009/0324666 | A1 | 12/2009 | Krongauz et al. |
| 2010/0019399 | A1 | 1/2010 | Kimura et al. |
| 2010/0021737 | A1 | 1/2010 | Beck et al. |
| 2010/0081001 | A1 | 4/2010 | Sander et al. |
| 2010/0092693 | A1 | 4/2010 | Park et al. |
| 2010/0255120 | A1 | 10/2010 | Collier et al. |

FOREIGN PATENT DOCUMENTS

| | | |
|---|---|---|
| EP | 1647585 | 4/2006 |
| EP | 1163553 | 6/2006 |
| EP | 1601729 | 6/2006 |
| EP | 1726607 | 11/2006 |
| EP | 2067800 | 6/2009 |
| EP | 2080790 | 7/2009 |
| GB | 2067210 | 7/1981 |
| WO | 96/29352 | 9/1996 |
| WO | 03/044030 | 5/2003 |
| WO | 03/089479 | 10/2003 |
| WO | 03/091287 | 11/2003 |
| WO | 2004/108799 | 12/2004 |
| WO | 2005/019503 | 3/2005 |
| WO | 2006/023790 | 3/2006 |
| WO | WO2006023790 | 3/2006 |
| WO | 2007/050704 | 5/2007 |
| WO | 2008/045480 | 4/2008 |
| WO | 2008/101806 | 8/2008 |
| WO | 2009/039137 | 3/2009 |
| WO | 2009086285 | 7/2009 |
| WO | 2010016075 | 2/2010 |

OTHER PUBLICATIONS

Lucirin TPO: BASF. (2001). online. [retrieved online Mar. 30, 2012]. Retrieved from internet <URL: http://www2.basf.us/rawmaterials/pdfs/LUC-TPO.pdf>.*

Esacure—KIP100F-MSDS Proudct Guide from Lamberti. (no date). oline. [Retrieved online Mar. 27, 2012]. Retrived from Internet<URL://http://www.lambertiusa.com/lambertiusa_auto/upload/News/Esacure%20KIP%20100%20F%20TDS1.pdf:>.*

CN985B88 (MSDS) from Sartomer (2005). online. [Retrived online Mar. 27, 2012]. Retrieved from Internet<URL://http://www.gmzinc.com/uploads/docs/MSDS_CN985B88.pdf?bcsi-ac-87a1566f7576e15c=1E6A737800000102SVAybgkguw8KLS+PWBKQyqyeK42rCgAAAgEAAGEOKACEAwAAAgAAAM-68CQA=>.*

CIBA Specialty Chemicals, "Photoinitiators for UV Curing", Key Products Selection Guide, Edition 2003, Switzerland.

* cited by examiner ed compound" refers to a compound including at least one melamine group and at least two ethylenic unsaturations.

DUAL CURE COATING COMPOSITIONS, METHODS OF COATING A SUBSTRATE, AND RELATED COATED SUBSTRATES

FIELD OF THE INVENTION

The present invention relates to dual cure coating compositions, methods of coating a substrate, and related coated substrates.

BACKGROUND INFORMATION

Despite their many environmental and energy savings advantages, radiation-curable compositions are used successfully in limited commercial applications. It would be desirable, therefore, to provide radiation-curable compositions capable of producing coatings having performance characteristics that might render the compositions desirable for use in applications that, heretofore, have rarely, if ever, employed radiation cure technology. Such performance characteristics include, for example, a smooth pleasing appearance suitable for, among other things, automotive applications, flexibility, adhesion to various substrates and coatings, resistance to scratch and mar, and exterior durability. Moreover, it would be desirable to provide such compositions that can be embodied as a one-component composition, and can be cured rapidly via radiation in an air environment.

SUMMARY OF THE INVENTION

In accordance with one exemplary embodiment, a dual cure coating composition is disclosed which comprises (a) a melamine-group containing polyethylenically unsaturated compound; and (b) an acrylate-containing composition comprising a urethane acrylate, an epoxy acrylate, and a multi-functional acrylate monomer; wherein the acrylate-containing composition (b) is present in the dual cure coating composition at a level sufficient to provide a cured coating layer deposited from the coating composition having a glass transition temperature (Tg) of 100° C. or below and a crosslink density of 20.0 mmoles/cc or below.

The exemplary embodiments are also directed to methods for coating a substrate, as well as related coated substrates.

In another exemplary embodiment, a radiation curable coating composition is disclosed comprising (a) a radiation curable compound; and (b) a photoinitiator composition comprising: (i) a photoinitiator having a peak absorbance within the wavelength range of 240 to 250 nanometers; (ii) a photoinitiator having a peak absorbance within the wavelength range of 250 to 260 nanometers; and (iii) a photoinitiator which absorbs UV light throughout the wavelength range of 350 to 410 nanometers, wherein the photoinitiator which absorbs UV light throughout the wavelength range of 350 to 410 nanometers comprises between about 0.05 and 0.95 weight percent of the total weight of the coating composition.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to dual cure coating compositions. As used herein, the term "dual cure" coating composition refers to a composition that will cure upon exposure to two different cure conditions. For example, in certain embodiments, the dual cure compositions of the present invention will cure upon exposure to a combination of thermal energy and radiation. As used herein, thermal energy is intended to include radiant energy such as infrared or microwave energy and the like; or conductive thermal energy such as that produced by a heated plate or hot air oven, for example. As used herein, the term "radiation" refers to ionizing radiation (e.g., electron beams) and/or actinic light (e.g., UV light).

Coating compositions that will cure upon exposure to radiation are often called radiation-curable compositions and, as such, comprise compounds that include radiation curable groups. As used herein, the term "radiation curable group(s)" refers to any functional group that can react, such as via an addition reaction, upon exposure to ionizing radiation and/or actinic light. Examples of such groups include, but are not limited to, acrylates, vinyl ethers, ethylenically unsaturated resins, maleic unsaturated polyesters, fumarates, thiols, alkenes, epoxies and the like. As used herein, the terms "acrylate," "acrylic," "acrylamide," and similar terms refer to the inclusion of the analogous methacrylate, methacrylic, and/or methacrylamide based molecules.

In certain embodiments, the dual cure compositions of the present invention are embodied as a one-component composition. As used herein, the term "one-component coating composition" refers to a coating composition where, during storage of the composition, the composition components are all admixed together but the properties of the composition, including viscosity, remain consistent enough over the time of storage to permit successful application of the coating onto a substrate at a later time.

As previously indicated, the dual cure compositions of the present invention comprise a melamine group-containing polyethylenically unsaturated compound. As used herein, the term "melamine group-containing polyethylenically unsaturated compound" refers to compounds comprising a triazine ring having attached thereto a plurality of carbon-carbon double bonds. For example, in certain embodiments, the melamine group-containing polyethylenically unsaturated compound is a melamine group-containing polyacrylate, which, as used herein, refers to compounds comprising a triazine ring having attached thereto a plurality of acrylate groups that may be the same or different.

Melamine group-containing polyacrylates that are believed to be suitable for use in the present invention include, without limitation, compounds encompassed by the general structure described in U.S. Pat. No. 4,266,053 ("the '053 patent") at col. 2, line 53 to col. 3, line 15, which can be prepared according to the procedure described in the '053 patent at col. 4, line 47 to col. 7, line 60, the cited portions of which being incorporated herein by reference; compounds encompassed by the general structures described in U.S. Pat. No. 5,296,571 ("the '571 patent") at col. 2, lines 1-45 and col. 3, lines 7-59, which can be prepared according to the procedure described in the '571 patent at col. 4, line Ito col. 7, line 20, the cited portions of which being incorporated herein by reference; and compounds encompassed by the general structure described in U.S. Pat. No. 3,020,255 ("the '255 patent") at col. 2, line 53 to col. 3, line 2, which can be prepared according to the procedure described in the '255 patent at col. 4, lines 13-32, the cited portions of which being incorporated herein by reference.

In certain embodiments, the melamine group-containing polyethylenically unsaturated compound that is used certain embodiments of the present invention comprises a plurality of alkoxy groups, such as methoxy or ethoxy groups. As a result, in certain embodiments, the melamine group-containing polyethylenically unsaturated compound is represented by the general formula:

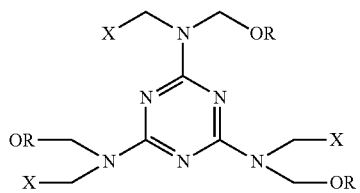

wherein each R, which may be the same or different, represents a $C_1$-$C_4$ alkyl group, such as a methyl group, and each X, which may be the same or different, represents a moiety comprising a carbon-carbon double bond, such as, for example, an acrylate. It is believed that compounds encompassed by the foregoing general structure are commercially available from Bomar Specialties Co., an example of which is the multi-functional melamine acrylate sold under the tradename BMA-250 melamine acrylate. Moreover, a compound encompassed by the foregoing general structure can be made by reacting a compound encompassed by the general structure described in the '053 patent, referenced above, with formaldehyde.

In certain embodiments of the present invention, the melamine group-containing polyethylenically unsaturated compound is present in an amount of 5 to 45 weight percent, based on the total resin solids of the coating composition.

As previously mentioned, in certain embodiments, the dual cure coating compositions of the present invention also comprise an acrylate-containing composition that is present in the dual cure coating composition at a level sufficient to provide a cured coating layer deposited from the coating composition that has a glass transition temperature (Tg) of 100° C. or below and a crosslink density of 20.0 mmoles/cc or below ("mmoles/cc" refers to millimoles per cubic centimeter).

In certain embodiments, the foregoing acrylate-containing composition is present at a level sufficient to provide a cured coating layer deposited from the coating composition having a glass transition temperature of 90° C. or below and a crosslink density of 15.0 mmoles/cc or below.

In certain embodiments, the foregoing acrylate-containing composition is present at a level sufficient to provide a cured coating layer deposited from the coating composition that has glass transition temperature between about 80° C. and 90° C. and a crosslink density of about 10.0 to 15.0 mmoles/cc.

As used herein, "glass transition temperature" refers to the glass transition temperature (Tg) of a cured material of 25-50 microns (approximately 1-2 mils) in thickness and free of solvent. As used herein, "crosslink density" refers to crosslink density of a cured material of 25-50 microns in thickness and free of solvent. The cured glass transition temperature and crosslink density may both be measured using a dynamic mechanical analyzer ("DMA"), such as a TA Instrument Q800 Unit utilizing the Tension Film mode with a frequency of 1 Hz (hertz); an amplitude of 20 μm; a temperature cycle of −50° C. to 200° C.; and a heating rate of 3° C. per minute. A sample size of 15 mm×8 mm×film thickness is typically used for DMA analysis. Analysis outputs include storage modulus (E'), loss modulus (E"), and loss tangent (E"/E'). The glass transition temperature and crosslink density are measured on the free film of the cured composition. Tg (° C.) is defined as the temperature at the maximum amplitude of the loss tangent (tan δ). Crosslink density (mole/cc) is calculated from storage modulus (E") above Tg. (Loren. W. Hill, "Structure/Property Relationships in Thermoset Coatings", *Journal of Coatings Technology*, Vol. 64, No. 808, May 1992.)

The acrylate-containing composition may include any compound containing an acrylate and/or (meth)acrylate group. Examples of such acrylate-containing compounds, which are suitable for use in the present invention include, without limitation, epoxy(meth)acrylates, urethane and polyurethane(meth)acrylates; multi-functional (meth)acrylate monomers; amine-(meth)acrylate adducts; polyester(meth)acrylates; polyalkoxylated and polyether(meth)acrylates; (meth)acrylated acrylic oligomers; and styrene-(meth)acrylic acid oligomers, as well as mixtures thereof.

In certain embodiments, the acrylate-containing composition is present from 55 to 95 weight percent, based on the total resin solids of the composition.

In certain embodiments, the acrylate-containing composition comprises a compound comprising functional group(s) reactive with the melamine group of the melamine group-containing polyethylenically unsaturated compound. Non-limiting examples of functional groups reactive with melamine include, for example, hydroxyl groups (—OH) and carbamates. In some cases, a reaction between melamine and a functional group reactive with melamine takes place at elevated temperatures, as discussed in more detail below.

In certain embodiments, the acrylate-containing composition comprises a mixture comprising a urethane acrylate, an epoxy acrylate, and a multi-functional acrylate monomer.

In certain embodiments, the acrylate-containing composition that comprises a mixture comprising a urethane acrylate, an epoxy acrylate, and a multi-functional acrylate monomer is present from 55 to 95 weight percent, based on the total resin solids of the composition.

Non-limiting examples of urethane acrylates include those products formed by the reaction of an isocyanate containing component with a hydroxyl containing component, wherein at least one of these components contains ethylenic unsaturation. Non-limiting examples of isocyanate functional components include hexamethylene diisocyanate, isophorone diisocyanate, isocyanate functional acrylic polymers and polyurethanes, reaction products of hydroxyl functional components (e.g. poly-ethylene glycol, poly-propylene glycol and di-, tri- and higher hydroxy functionality aliphatic alcohols (e.g. glycerol and trimethylolpropane) and their ethoxylated, propoxylated and polycaprolactone analogs) with di-, tri- and etc. isocyanates (e.g. hexamethylene diisocyanate, isophorone diisocyanate and toluene diisocyanate (TDI)). Non limiting examples of hydroxy containing ethylenically unsaturated components include hydroxyethyl acrylate and its ethoxylated, propoxylated and polycaprolactone analogs.

Suitable urethane acrylates also include those that are a reaction product of: (i) an adduct of a polyisocyanate; and (ii) an active hydrogen-containing acrylate, wherein the adduct of a polyisocyanate comprises a reaction product of reactants comprising a polyisocyanate comprising greater than two isocyanate groups and a compound having groups reactive with the isocyanate groups of the polyisocyanate.

In certain embodiments, to prepare the foregoing adduct of the polyisocyanate, the molar ratio of the polyisocyanate to the compound having groups reactive with the isocyanate groups of the polyisocyanate is greater than 1:1, such as 2:1 or at least 2:1.

In certain embodiments, the molar ratio of the active hydrogen-containing acrylate (ii) to the adduct of the polyisocyanate (i) is greater than 1:1, such as a molar ratio of 4:1 or at least 4:1.

Suitable examples of polyisocyanates having more than two isocyanate groups include, for example, an isocyanurate of 1,6-hexamethylene-diisocyanate, an isocyanurate of isophorone diisocyanate, as well as combinations thereof. Suitable examples of compounds having groups reactive with the isocyanate groups of the polyisocyanate may include, for example, polyols such as pentaerythritol, neopentylglycol, dicidol, trimethylolpropane, and diols, such as monoethylene glycol, 1,2-propylene glycol, 1,3-propylene glycol, 1,4-butylene glycol, 2,3-butylene glycol, 1,5-pentanedial, 1,6-hexanediol, 1,8-octanediol, decanediol, dodecanediol, neopentylglycol, cyclohexanediol, as well as combinations thereof. Non-limiting examples of suitable active hydrogen-containing acrylates include, but are not limited to, hydroxyl-functional acrylates including hydroxylethyl acrylate, hydroxylethyl(meth)acrylate, hydroxylpropyl acrylate, hydroxylpropyl(meth)acrylate, 4-hydroxylbutyl acrylate, 4-hydroxylbutyl(meth)acrylate, and the like. Also, hydroxyl functional adducts of caprolactone and hydroxylalkyl acrylates can be used.

In certain embodiments, the urethane acrylate component of the acrylate-containing composition that comprises a mixture of a urethane acrylate, an epoxy acrylate, and a multi-functional acrylate monomer is present from about 5 to 45 weight percent, based upon on the total resin solids of the composition.

In certain embodiments, the urethane acrylate comprises a mixture comprising a polycarbonate urethane acrylate and a polyester urethane acrylate.

Non-limiting examples of polycarbonate urethane acrylates suitable for the present invention include those products formed by the reaction of alkylene or arylene polycarbonate dials with isocyanates, hydroxyl-containing (meth)acrylates, and other diols.

Suitable polycarbonate diols include, but are not limited to, hexanediol based polycarbonate diols, pentanediol based polycarbonate diols, cyclohexanedimethanol based polycarbonate diols, and mixed alcohol polycarbonate diols and polyols.

Suitable polycarbonate urethane acrylates are commercially available from Sartomer Co., Inc. under the trademark SARTOMER, including for example, SARTOMER CN 2922 urethane acrylate.

In certain embodiments, the polycarbonate urethane acrylate component of the urethane acrylate that comprises a mixture comprising a polycarbonate urethane acrylate and a polyester urethane acrylate is present from about 5 to 45 weight percent, based on the total resin solids of the composition.

Non-limiting examples of polyester urethane acrylates mixed with polycarbonate urethane acrylates include those products formed by the reaction of hydroxyl functional polyester acrylates with isocyanate functional materials, including any of those described above with respect to the urethane acrylates. Polyester acrylates may include reaction products of polyester polyols with acrylic acid, among others.

Suitable polyester urethane acrylates are commercially available from Sartomer Co., Inc. under the trademark SARTOMER, including for example, SARTOMER CN2920 urethane acrylate.

In certain embodiments, the polyester urethane acrylate may be formed by the reaction of a hydroxyl-functional polyester with an isocyanate acrylate adduct such as IPDI-HEA (isophorone diisocyanate-hydroxyethylacrylate).

In certain embodiments, the polyester urethane acrylate component of the urethane acrylate, that comprises a mixture comprising a polycarbonate urethane acrylate and a polyester urethane acrylate, is present from about 5 to 45 weight percent, based on the total resin solids of the composition.

In certain embodiments, the polyester urethane acrylate component of the urethane acrylate, that comprises a mixture comprising a polycarbonate urethane acrylate and a polyester urethane acrylate, further comprises tripropylene glycol diacrylate (TPGDA). Suitable commercially versions of TPGDA are available from Sartomer Co., Inc. under the trademark SARTOMER, including for example, SARTOMER CN966A80 acrylate.

In certain embodiments, the tripropylene glycol diacrylate component of the urethane acrylate that comprises a mixture comprising a polycarbonate urethane acrylate and a polyester urethane acrylate is present from about 1 to 10 weight percent, based on the total resin solids of the composition.

Non-limiting examples of epoxy acrylates include those products formed by the reaction of acrylic acid and/or (meth) acrylic acid with an epoxy(glycidyl) functional component, e.g. aliphatic and aromatic containing epoxy resins, epoxidized oils, acrylic polymers and acrylic grafted polymers in which the acrylic component contains pendent epoxy groups. Some of the acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl(meth)acrylate.

In certain embodiments, the epoxy acrylate component of the acrylate-containing composition that comprises a mixture comprising a urethane acrylate, an epoxy acrylate, and a multi-functional acrylate monomer is present from about 5 to 45 weight percent, based upon on the total resin solids of the composition.

Non-limiting examples of multi-functional acrylate monomers, suitable for use in the present invention, include acrylic acid esters of di-, tri- and higher hydroxy functionality alcohols: e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogs of all the above. Suitable multi-functional acrylate monomers are commercially available from Sartomer Co., Inc. under the trademark SARTOMER.

In certain embodiments, the multi-functional acrylate monomer comprises a five or more acrylate groups per molecule, such as is the case with pentaacrylate and hexaacrylate monomers. In other embodiments, the pentaacrylate monomer comprises dipentaerythritol pentaacrylate such as SARTOMER SR399 acrylate, commercially available from Sartomer Co., Inc.

In certain embodiments, the multi-functional acrylate monomer component of the acrylate-containing composition that comprises a mixture comprising a urethane acrylate, an epoxy acrylate, and a multi-functional acrylate monomer is present from about 5 to 33 weight percent, based upon on the total resin solids of the composition.

In certain embodiments, the compositions of the present invention may also include a polysiloxane resin, for example, those polysiloxane resins disclosed in U.S. Patent Application Publication No. 2009/0082514 A1 at paragraph [0018] through paragraph [0031]. The presence of a polysiloxane resin may have an impact on the Tg and/or crosslink density of the compositions of the present invention. If a polysiloxane resin is present, the level is such that the Tg and crosslink density of the cured coating layer deposited from the coating composition containing a polysiloxane is 100° C. or below and 20.0 mmoles/cc or below, respectively. In other embodiments, the compositions of the present invention are substantially free, and in other cases, completely free of a polysiloxane resin. As used herein, the term "substantially free" as it refers to a polysiloxane resin means that the polysiloxane resin is present at a level of less than 1 percent by weight, based on the total weight of the composition. As used herein, the term "completely free" as it refers to a polysiloxane resin means that the polysiloxane resin is not present in the composition at all.

In addition to the previously described components, the compositions of the present invention may include other components, such as, for example, free radical photoinitiators. Examples of free radical photoinitiators suitable for use in the present invention include, for example, alpha-cleavage photoinitiators and hydrogen abstraction photoinitiators. Cleavage-type photoinitiators include acetophenone derivatives, alpha-aminoalkylphenones, alpha-hydroxyalkylphenones, alkyl phenylglycoxylates, benzoin alkyl ethers, benzyl ketals, benzoyl oximes, benzimidazoles, acylphosphine oxides and bisacyiphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of free radical photoinitiators that may be used in the coating compositions of the present invention include benzil, benzoin, benzoin methyl ether, benzoin isobutyl ether, 2,2-dimethoxy-2-phenylacetophenone, acetophenone, benzophenone, 4,4'-dichlorobenzophenone, 4,4'-bis(N,N'-dimethylamino)benzophenone, diethoxyacetophenone, 2-hydroxy-2-methyl-1-phenylpropan-1-one, 1-hydroxycyclohexyl phenyl ketone, 2-hydroxy-1-(4-(2-hydroxyethoxy)phenyl)-2-methyl-1-propanone, methyl phenyl glycoxylate, a mixture of Oxy-phenyl-acetic acid 2-[2-oxo-2-phenyl-acetoxy-ethoxy]-ethyl ester and Oxy-phenyl-acetic acid 2-[2-hydroxy-ethoxy]-ethyl ester, 2-isopropylthioxanthone, 2-benzyl-2-dimethylamino-1-(4-morpholinophenyl)-1-butanone, 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, 2,6-dimethoxybenzoyldiphenylphosphine oxide, bis(2,6-dimethyoxybenzoyl)-2,4,4-trimethylepentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof. Free radical initiators are commercially available from, for example, Lamberti S.p.A. under the tradename ESACURE®, for example ESACURE® ONE, and Ciba Specialty Chemicals Corporation under the tradename DAROCUR®, for example, DAROCUR® 1173 initiator, IRGACURE®, for example, IRGACURE® 184 initiator and IRGACURE® 500 initiator, and GENOCURE®, for example, GENOCURE® MBF.

In certain embodiments, the coating compositions of the present invention comprise 0.1 to 15 percent by weight of free radical photoinitiator or, in some embodiments, 0.1 to 10 percent by weight, or, in yet other embodiments, 0.1 to 5 percent by weight of free radical photoinitiator based on the total weight of the composition. Moreover, it has been discovered that by careful selection of particular combinations of photoinitiators, in particular amounts, it is possible to provide radiation curable compositions, such as those described herein, that are capable of curing in an oxygen rich atmosphere, such as ambient air, while still providing cured coatings with good physical properties, such as humidity resistance, but with little yellowing.

As a result, in certain embodiments, the coatings compositions of the present invention comprise a photoinitiator composition comprising: (a) a photoinitiator having a maximum absorbance with a molar extinction coefficient of from $1\times10^{3.80}$ to $1\times10^{4.20}$ (L mol$^{-1}$ cm$^{-1}$) within a wavelength range of 240 to 250 nanometers; (b) a photoinitiator having a maximum absorbance with a molar extinction coefficient of from $1\times10^{3.85}$ to $1\times10^{4.25}$ (L mol$^{-1}$ cm$^{-1}$) within a wavelength range of 250 to 260 nanometers; and (c) a photoinitiator having a molar extinction coefficient greater than $1\times10^2$ (L mol$^{-1}$ cm$^{-1}$) at a wavelength of 380 nanometers.

For purposes of the present invention, the molar extinction coefficient of a particular material can be measured using an absorbance spectrophotometer as described in N. S. Allen et al., Surface Coatings International, (2) 67, 1999.

Photonitiators having a maximum absorbance with a molar extinction coefficient of from $1\times10^{3.80}$ to $1\times10^{4.20}$ (L mol$^{-1}$ cm$^{-1}$) within a wavelength range of 240 to 250 nanometers include, for example, 1-hydroxylcyclohexyl phenyl ketone and 2-hydroxy-2-methyl-1-phenylpropan-1-one. Such photoinitiators are commercially available as, for example, IRGACURE® 184 and DAROCUR® 1173.

In fact, in some embodiments, the photoinitiator composition comprises two or more photonitiators having a maximum absorbance with a molar extinction coefficient of from $1\times10^{3.80}$ to $1\times10^{4.20}$ (L mol$^{-1}$ cm$^{-1}$) within a wavelength range of 240 to 250 nanometers. In these embodiments, at least one such photoinitator has a boiling point (at atmospheric pressure) of greater than 120° C., such as greater than 150° C. or greater than 200° C., such as is the case with 1-hydroxylcyclohexyl phenyl ketone (commercially available as IRGACURE® 184) and at least one such photoinitator has a boiling point (at atmospheric pressure) of no more than 120° C., such as no more than 100° C. or no more than 90° C., such as is the case with 2-hydroxy-2-methyl-1-phenylpropan-1-one (commercially available as DAROCUR® 1173). More specifically, in certain embodiments, the photoinitiator composition comprises (i) a photonitiator having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers that has a boiling point (at atmospheric pressure) of greater than 120° C., and (ii) a photonitiator having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers that has a boiling point (at atmospheric pressure) of no more than 120° C., wherein the weight ratio of (i) to (ii) is at least 1:1, in some cases at least 2:1, and, in yet other cases, 2:1 to 3:1.

In certain embodiments, the coating compositions of the present invention comprise up to 5 percent by weight, such as up to 2 percent by weight, or, in some cases up to 1.5 percent by weight, or, in yet other cases, up to 1.2 percent by weight, of free radical photoinitiator(s) having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers, such weights percent being based on the total weight of the composition. In certain embodiments, the coating compositions of the present invention comprise at least 0.1 percent by weight, such as at least 0.5 percent by weight, or, in some cases at least 0.8 percent by weight, or, in yet other cases, at least 0.9 percent by weight, of free radical photoinitiator(s) having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers.

Photonitiators having a maximum absorbance with a molar extinction coefficient of from $1 \times 10^{3.85}$ to $1 \times 10^{4.25}$ (L mol$^{-1}$ cm$^{-1}$) within a wavelength range of 250 to 260 nanometers include oligo[2-hydroxy-1-(4-(2-hydroxyethoxy)phenyl)-2-methyl-1-propanone], methyl phenyl glycoxylate, 2,2-dimethoxy-2-phenylacetophenone and the chemical mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. Such photoinitiators are commercially available as, for example, ESACURE® ONE, GENOCURE® MBF, IRGACURE® 651 and IRGACURE® 754.

In certain embodiments, the coating compositions of the present invention comprise up to 2 percent by weight, such as up to 1 percent by weight, or, in some cases up to 0.6 percent by weight, or, in yet other cases, up to 0.5 percent by weight, of free radical photoinitiator having a maximum absorbance with a molar extinction coefficient of from $1 \times 10^{3.85}$ to $1 \times 10^{4.25}$ (L mol$^{-1}$ cm$^{-1}$) within a wavelength range of 250 to 260 nanometers, such weights percent being based on the total weight of the composition. In certain embodiments, the coating compositions of the present invention comprise at least 0.1 percent by weight, such as at least 0.2 percent by weight, or, in some cases at least 0.3 percent by weight, or, in yet other cases, at least 0.4 percent by weight, of free radical photoinitiator having a maximum absorbance with a molar extinction coefficient of from $1 \times 10^{3.85}$ to $1 \times 10^{4.25}$ (L mol$^{-1}$ cm$^{-1}$) within a wavelength range of 250 to 260 nanometers, such weight percents being based on the total weight of the composition.

Photoinitiators having a molar extinction coefficient greater than $1 \times 10^{2}$ (L mol$^{-1}$ cm$^{-1}$) at a wavelength of 380 nanometers include 2,4,6-trimethylbenzoyldiphenylphosphine oxide and bis(2,4,6-trimethylbenzoyl)phenyl phosphine oxide. Such photoinitiators are commercially available as, for example, IRGACURE® 819 and DAROCUR® TPO.

In certain embodiments, the coating compositions of the present invention comprise up to 1 percent by weight, such as up to 0.5 percent by weight, or, in some cases up to 0.2 percent by weight, or, in yet other cases, up to 0.1 percent by weight, of free radical photoinitiator having a molar extinction coefficient greater than $1 \times 10^{2}$ (L mol$^{-1}$ cm$^{-1}$) at a wavelength of 380 nanometers, such weights percent being based on the total weight of the composition. In certain embodiments, the coating compositions of the present invention comprise at least 0.01 percent by weight, such as at least 0.05 percent by weight, or, in some cases at least 0.06 percent by weight, or, in yet other cases, at least 0.07 percent by weight, of free radical photoinitiator having a molar extinction coefficient greater than $1 \times 10^{2}$ (L mol$^{-1}$ cm$^{-}$) at a wavelength of 380 nanometers, such weight percents being based on the total weight of the composition It should be noted that certain commercially available photoinitiators comprise a mixture of two or more different types of the photoinitiators described above, such as is the case with, for example, DAROCUR® 4265 (a 50/50 wt % mixture of 2-hydroxy-2-methyl-1-phenylpropan-1-one/2,4,6-trimethylbenzoyldiphenylphosphine oxide), and IRGACURE® 2022 (an 80/20 wt % mixture of 2-hydroxy-2-methyl-1-phenylpropan-1-one/bis(2,4,6-trimethylbenzoyl)phenyl phosphine oxide.

In certain embodiments, the coating compositions of the present invention also include a catalyst suitable for promoting the reaction between the previously described melamine group-containing polyethylenically unsaturated compound and the previously described acrylate-containing compounds having functional groups therewith. Suitable catalysts for this purpose include acidic materials, for example, acid phosphates such as phenyl acid phosphate, and substituted or unsubstituted sulfonic acids, such as dodecylbenzene sulfonic acid or paratoluene sulfonic acid.

In certain embodiments, the catalyst is present in an amount ranging from 0.1 to 10.0 percent by weight, such as 0.5 to 4.0 percent by weight, based on the total weight of resin solids in the coating composition.

In certain embodiments, the compositions of the present invention also may comprise any of a variety of other additives, such as rheology modifiers, surfactants, UV absorbers, hindered amine light stabilizers, wetting agents, sanding additives, antioxidants, solvents, and flatting agents (e.g. wax-coated or non-wax coated silica or other inorganic materials), among other materials.

In certain embodiments, the compositions of the present invention may also comprise solvents, such as organic solvents. Suitable organic solvents include, but are not limited to, acetates, aromatics, alcohols, ketones, among others. In certain embodiments, the compositions of the present invention comprise organic solvents and do not contain any water.

In certain embodiments, the solvent is present in an amount ranging from 0.1 to 50 percent by weight, such as from 10 to 40 percent by weight, based on the total weight of the coating composition. In certain embodiments, the solvent is present in an amount of about 30 percent by weight (i.e. the solids content of the coating composition is about 70%), based on the total weight of the coating composition.

In certain embodiments, the dual cure composition of the present invention may be a substantially colorless, transparent clear coating composition. In these embodiments, the composition is substantially free, or in some cases, completely free of a colorant. As used herein, the term "substantially free" as it refers to a colorant means that the colorant is present at a level of less than 1 percent by weight, based on the total weight of the composition. As used herein, the term "completely free" as it refers to a colorant means that the colorant is not present in the composition at all.

In other embodiments, the coating compositions of the present invention may also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture comprising two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene, aluminum and quinacridone.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nanometers, such as less than 70 nanometers, or less than 30 nanometers. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Publication 2005/0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 0.1 to 10 weight percent of the present compositions, such as from 2 to 10 weight percent or 3 to 5 weight percent, with weight percent based on the total weight of the compositions.

The dual cure compositions of the present invention may be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material.

Accordingly, the present invention is further directed to a substrate at least partially coated with one or more of the present compositions.

The coating compositions of the invention are particularly useful as top coats and/or clear coats in color-clear composite coatings. The compositions of the invention in the pigmented form can be applied directly to a substrate to form a color coat. Alternately, the coating composition of the invention can be unpigmented, for example, in the form of a clearcoat for application over a color coat (either a primer coat or a colored base coat). When used as a color topcoat, dry film thicknesses can range from 0.5 to 5.0 mils, such as 0.5 to 2.5 mils. When used as a clearcoat, dry film thicknesses can range from 0.5 to 5.0 mils, such as from 1.0 to 4.0 mils.

The coating compositions of the present invention can be applied to a variety of substrates, for example automotive substrates such as fenders, hoods, doors and bumpers, and industrial substrates such as household appliances, including washer and dryer panels and lids, refrigerator doors and side panels, lighting fixtures and metal office furniture. Such automotive and industrial substrates can be metallic, for example, aluminum and steel substrates, and non-metallic, for example, thermoplastic or thermoset (i.e. "polymeric") substrates including, for example, transparent plastic substrates, polycarbonate, and polymethyl methacrylate and elastomeric substrates such as thermoplastic polyolefin, as described in more detail below.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Other suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In certain embodiments, such a substrate has been coated or treated with a wood stain and or toner prior to application of the compositions of the present invention.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrib, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Once applied, the compositions of the present invention can be cured by, for example, thermal energy followed by radiation. For example, the coating composition can be cured by first baking the coating so as to cause the reaction between the previously described melamine group-containing ethylenically unsaturated compounds and the previously described acrylate-containing composition different from the melamine group-containing polyethylenically unsaturated compound. The radiation curable moieties present in the coating composition may then be cured by irradiation of the coating composition with ultraviolet rays and/or electron beam radiation, as is known to those skilled in the art. Moreover, the radiation curing can be conducted in an oxygen rich atmosphere, such as ambient air.

In certain embodiments, the coating composition may be cured by the following method. First, a clearcoat is applied to a substrate material to a desired wet film thickness using, for example, a Bell electrostatic sprayer, an air atomized sprayer or via a drawdown bar. The substrate may be a metal substrate such as aluminum or steel or a polymeric substrate such as polyvinyl films (Tedlar®) or polyester films, depending upon the application. Next, the clearcoat layer may be allowed to flash between, for example, 0 and 10 minutes and may be heated in, for example, an infrared (IR) oven to achieve a coating target temperature of, for example, 80-120° C. (180-250° F.). Once the coating target temperature is achieved, the coated part may be maintained at that temperature for some period of time, such as 2-4 minutes, depending upon the composition of the substrate material. Next, the coated part may be exposed to UV radiation, such as, for example, by exposing the part to a Fusion 600 W type H lamp with a target distance of 2-3 inches from the coating surface. The target energy density (sometimes referred to as "dose") may be, for example, in a range from 500 to 1600 Joules/cm$^2$, such as 1.2 Joules/cm$^2$ (1200 mJ/cm$^2$), and the target intensity in the UV-A region may be, for example, in the range of 500 to 1600 mW/cm$^2$, such as 1.2 W/cm$^2$ (1200 mW/cm$^2$). The time of UV exposure is often dependent upon achieving the correct dose and intensity on any given area and all areas that need to be exposed. The cured coating layer formed in accordance with these methods may have a glass transition temperature of 100° C. or below and a crosslink density of 20.0 mmoles/cc or below.

Generally, coatings with good flexibility have decreased mar and/or scratch resistance. The coating compositions of the present invention, however, often possess good flexibility and also possess good mar and/or scratch resistance, as is illustrated by the Examples. As used herein, the terms "mar" and "scratch" refer to physical deformations resulting from mechanical and/or chemical abrasion. As used herein, "mar resistance" is a measure of a material's ability to resist appearance degradation caused by small scale mechanical stress. As used herein, "scratch resistance" is the ability of a material to resist more severe damage that can lead to visible, deeper or wider trenches. Scratches are generally regarded as being more severe than what is referred to in the art as mar, and the two are regarded in the art as being different. Typically, marring and scratching can result from manufacturing and environmental factors, as well as through normal use. Although mar and scratch are in many respects differing degrees of the same thing, a coating that improves mar resistance may not be effective in improving scratch resistance, and vice versa.

The present invention is further directed to a multi-layer composite coating comprising a first coating layer and a second coating layer applied over at least a portion of the first coating layer, wherein the second coating layer is deposited from any of the coating compositions of the present invention. The first coating layer can be cured before application of the second coating layer, or the two coats can be cured together.

In certain embodiments, the first coating layer has a dry film thickness from 0.1 to 10 mils, such as from 0.5 to 2.5 mils. In other embodiments, the second coating layer has a dry film thickness from 0.5 to 5.0 mils, such as from 1.0 to 4.0 mils.

In certain embodiments, the first coating layer is deposited from a first coating composition comprising a film-forming polymer. In other embodiments, the first coating layer is deposited from a base coat composition comprising a pigmented film-forming polymer. Any suitable base coat composition may be used. Suitable film-forming polymers may include, but not limited to, polyether polymers, polyester polymers, acrylic polymers, silicon-based polymers, polyepoxide polymers, polyurethane polymers, as well as mixtures of any of the foregoing.

The first coating composition may be uncrosslinked (referred to as thermoplastic) or crosslinked (referred to as thermoset), for example, through the addition of a curing agent.

One or more curing agents having functional groups reactive with functionality on the film-forming polymer may also be used in the first coating composition, unless the film-forming polymer can react with itself, in which case additional curing agents may or may not be used.

Useful curing agents for film-forming polymers containing hydroxyl groups include polyisocyanates and polyanhydrides. Useful curing agents for polyepoxide polymers include, for example, aliphatic, cycloaliphatic, and aromatic polyfunctional amines; polyamides; polyureas; and polyfunctional acids.

In certain embodiments, the second coating layer is substantially transparent. This is a color-plus-clear system discussed above, frequently used in automotive applications.

In certain embodiments, the first coating composition and/or the compositions of the present invention comprises an adhesion promoter. Suitable adhesion promoters are described in U.S. Pat. No. 7,329,468 ("the '468 Patent"), col. 15, line 4 through col. 24, line 49, the cited portion of which being incorporated herein by reference. In certain embodiments, the adhesion promoter comprises a boron-containing compound such as those described in the '468 Patent, col. 15, line 4 through col. 24, line 23, the cited portion of which being incorporated herein by reference.

Indeed, it has been discovered that the intercoat adhesion, that is, the adhesion between the first and second coating layers can be improved by the presence of an adhesion promoter, for example a boron-containing compound, in the first coating composition and/or the coating compositions of the present invention when the coating compositions of the present invention are applied directly adjacent to the first coating composition. As used herein, the term "directly adjacent" means that no other coatings are disposed between the first coating and the second coating.

The adhesion promoter, including a boron-containing compound, may be present in the first coating composition and/or the coating compositions of the present invention in any amount sufficient to improve intercoat adhesion between the coating layers. In certain embodiments, the adhesion promoter may be present in the coating composition of the present invention in an amount ranging from 1.0 to 10.0 percent by weight, such as from 2.0 to 5.0 percent by weight, based on the total weight of the coating composition. In certain embodiments, the adhesion promoter may be present in the first coating composition in an amount ranging from 0.5 to 10.0 percent by weight, such as from 2.0 to 5.0 percent by weight, based on the total weight of the first coating composition.

In other embodiments, the first coating composition from which the first coating layer of the multi-layer composite coating is deposited comprises an acrylate-containing compound, including any of the aforementioned acrylate-containing compounds described above as suitable for the coating compositions of the present invention. In certain embodiments, the acrylate-containing compound present in the first coating composition comprises a polyester urethane(meth) acrylate.

In certain embodiments, the acrylate-containing compound is present in the first coating composition in an amount ranging from 0.1 to 5 percent by weight, such as from 1 to 2 percent by weight, based on the total weight of the first coating composition.

In still other embodiments, the first coating composition comprises an initiator, including any of those free radical initiators discussed above with respect to the coating compositions of the present invention. Suitable non-limiting initiators include VAZO® 67 initiator, VAZO® 88 initiator, and the like. VAZO® 67 initiator and VAZO® 88 initiator are each commercially available from E. I. du Pont de Nemours and Company of Wilmington, Del. In certain embodiments, the initiator is present in the first coating composition in an amount ranging from 0.1 to 2.0 percent by weight, such as from 0.5 to 1.0 percent by weight, based on the total weight of the first coating composition.

It has been discovered that the appearance of a thermoplastic basecoat can be improved by the use of an initiator, such as a free-radical initiator, and/or an acrylate-containing compound in the first coating composition and/or the present invention composition when the coating composition of the present invention is applied directly adjacent to the first coating composition. It is believed that the presence of an initiator in the first coating and/or the present invention composition reacts during the thermal cycle to polymerize the presence of acrylates in the first coating composition and/or the composition of the present invention, although the inventors do not wish to be bound by any particular theory.

Illustrating the invention are the following examples that are not to be considered as limiting the invention to their details. All parts and percentages in the examples, as well as throughout the specification, are by weight unless otherwise indicated.

EXAMPLES

Examples 1-6

Preparation of Coating Compositions

In this Example, various coating compositions according to certain embodiments of the present invention were prepared to determine the actual range of values for possible mixtures of components that provided the desired Tg, crosslink density, and Fisher microhardness (FMH). The coating compositions were formulated using the ingredients and amounts listed in Table 1.

To form the compositions of Examples #1-6, Components 1 to 5 were added and mixed until dissolved and homogeneous. Next, Components 6 to 20 were added in order with agitation and mixed until homogeneous. The final mixture was allowed to rest for a minimum of 16 hours (typically overnight) to allow the formulas to equilibrate before application. The viscosity was, if necessary, adjusted after this time period with additional n-Amyl Acetate depending on the type of application desired (i.e. air atomized spray, Bell electrostatic spray, drawdown and the like).

TABLE 1

| Component - Name | Ex. #1 | Ex. #2 | Ex. #3 | Ex. #4 | Ex. #5 | Ex. #6 |
|---|---|---|---|---|---|---|
| 1 - Ethyl Acetate | 5.3 | 5.3 | 5.3 | 5.3 | 5.3 | 5.3 |
| 2 - Solvesso 150 | 7.6 | 7.5 | 7.6 | 7.6 | 7.6 | 7.6 |
| 3 - n-Amyl Acetate | 16.2 | 16.0 | 16.2 | 16.2 | 16.2 | 16.2 |
| 4 - CAB 551-0.01 | 2.34 | 2.32 | 2.34 | 2.34 | 2.33 | 2.34 |
| 5 - Ciba Tinuvin 928 | 0.46 | 0.46 | 0.46 | 0.46 | 0.46 | 0.46 |
| 6 - Ciba Tinuvin 123 | 0.56 | 0.56 | 0.56 | 0.56 | 0.56 | 0.56 |
| 7 - Sartomer CN2922 | 7.16 | 7.13 | 7.70 | 7.86 | 8.80 | 15.40 |
| 8 - Sartomer CN966A80 | 7.16 | 7.13 | 15.40 | 7.86 | 8.80 | 7.70 |
| 9 - Sartomer CN2920 | 23.03 | 11.46 | 12.39 | 12.63 | 14.16 | 12.39 |
| 10 - Sartomer SR399 | 6.53 | 6.51 | 7.03 | 7.17 | 8.03 | 7.03 |
| 11 - Sartomer NTX11374 | 6.03 | 6.00 | 6.49 | 13.24 | 7.41 | 6.49 |
| 12 - Bomar BMA250 | 11.32 | 22.54 | 12.18 | 12.43 | 13.92 | 12.18 |
| 13 - K-Cure 129B | 0.78 | 1.55 | 0.84 | 0.85 | 0.96 | 0.84 |
| 14 - Triphenyl Phosphite | 0.08 | 0.08 | 0.08 | 0.08 | 0.08 | 0.08 |
| 15 - Darocur ® 1173 | 0.25 | 0.25 | 0.25 | 0.25 | 0.25 | 0.25 |
| 16 - Genocure MBF | 0.42 | 0.42 | 0.42 | 0.42 | 0.42 | 0.42 |

TABLE 1-continued

| Component - Name | Ex. #1 | Ex. #2 | Ex. #3 | Ex. #4 | Ex. #5 | Ex. #6 |
|---|---|---|---|---|---|---|
| 17 - Irgacure ® 184 | 0.77 | 0.77 | 0.77 | 0.77 | 0.77 | 0.77 |
| 18 - Darocur ® 4265 | 0.15 | 0.15 | 0.15 | 0.15 | 0.15 | 0.15 |
| 19 - BYK-310 | 0.06 | 0.06 | 0.06 | 0.06 | 0.06 | 0.06 |
| 20 - Aerosil R812S | 3.80 | 3.80 | 3.80 | 3.80 | 3.80 | 3.80 |

Component 1/CAS # 141-78-6/supplied by British Petroleum
Component 2/CAS # 64742-94-5/supplied by Citgo Petroleum Corporation
Component 3/CAS # 628-63-7/supplied by Dow Chemical
Component 4/CAS # 9004-36-8/supplied by Eastman Chemical
Component 5/CAS # 73936-91-1/supplied by Ciba Specialty Chemicals
Component 6/CAS # 129757-67-1/supplied by Ciba Specialty Chemicals
Component 7/CAS # CERT LTR/supplied by Sartomer
Component 8/CAS # CERT LTR/supplied by Sartomer
Component 9/CAS # CERT LTR/supplied by Sartomer
Component 10/CAS # 60506-81-2/supplied by Sartomer
Component 12/CAS # PMN 4006/supplied by Sartomer
Component 12/CAS # CERT LTR/supplied by Bomar Specialty Co.
Component 13/CAS # CERT LTR/supplied by King Industries
Component 14/CAS # 101-02-0/supplied by Acros Chemical
Component 15/CAS # 7473-98-5/supplied by Chitec Chemical Co.
Component 16/CAS # 15206-55-0/supplied by Akzo Chemical Inc.
Component 17/CAS # 947-19-3/supplied by Chitec Chemical Co.
Component 18/CAS # MIXTURE/supplied by Ciba Additives
Component 19/CAS # CERT LTR/supplied by BYK
Component 20/CAS # 68909-20-6/supplied by Evonik Degussa Preparation of Test Panels for DMA and FMH Analysis:

The coatings of Table 1 were applied over a 4×12" aluminum substrate using a drawdown bar with a target dry film thickness of 40-50 microns. The panels were cured as described substantially in accordance with paragraph [0086] above. DMA analysis was performed as described in paragraph [0020] above. FMH was tested using a Fischerscope HCU with associated hardware and software according to the following procedure: The indenter is moved to its home position at 70 μm (30 μm below the panel). A slow approach to the surface then takes place until the surface is detected, typically between 90 and 100 μm. The first measurement must bring the indenter from its resting position at 0 μm to home at 70 μm. After the first measurement the indenter is left in its home position until the software is turned off. A series of 3 measurements are taken and the average is recorded. The results are summarized in Table 2 for each of coating Examples 1-6.

TABLE 2

| | Ex. #1 | Ex. #2 | Ex. #3 | Ex. #4 | Ex. #5 | Ex. #6 |
|---|---|---|---|---|---|---|
| Fischer micro hardness (N/mm2) | 133 | 124 | 98 | 134 | 128 | 109 |
| Tg (° C.) | 83 | 80 | 74 | 84 | 82 | 76 |
| Crosslink Density (mmoles/cc) | 6.5 | 14.9 | 4.2 | 10.2 | 10 | 6.8 |

Testing of Coating Composition

A series of black and white basecoat 4"×12" test panels were prepared, applied and cured according to the paint manufacture specifications. Coating Example #5 from Table 1 was applied over the test panels using a Bell electrostatic spray application with a target dry film thickness of 40-50 microns. The finished panels were cured as described in paragraph [0086] above. Test results are set forth in Table 3.

TABLE 3

| Test Description | Black Basecoat | White Basecoat |
|---|---|---|
| Initial 20° gloss | 85 | 86 |
| Initial Distinctness of image (DOI) | 93 | 95 |
| Initial L value | 1.174 | N/A |
| Initial B value | N/A | −0.847 |
| 720 hours QUV-A 20° gloss | 84 | 86 |
| 720 hours QUV-A DOI | 92 | 90 |
| 720 hours QUV-A cracking | None | None |
| Initial X scribe adhesion test | 100% adhesion | 100% adhesion |
| 7 days @ 100° F./100% humidity test | No blisters/ 100% adhesion | No blisters/ 100% adhesion |
| 24 hours @ 100° F. Dot 4 brake fluid test | Very slight swelling/100% adhesion | Very slight swelling/100% adhesion |
| 24 hours @ 100° F. 5W/30 motor oil test | No swelling/ 100% adhesion | No swelling/ 100% adhesion |
| 336 hours salt box corrosion test | 100% adhesion | 100% adhesion |
| 10 cycle crockmeter mar - 20° gloss | 74 | N/A |
| 10 cycle carwash test - 20° gloss | 74 | N/A |
| Mar test % gloss retention | 87% | N/A |
| Carwash test % gloss retention | 87% | N/A |

Gloss - ASTM D523
DOI - ASTM D5767
Color - ASTM D1729
Adhesion test - ASTM D3359
Humidity Test - Performed in Chrysler Box Humidity Chamber
Brake Fluid and motor oil test - apply 3-5 drops to panel and place cotton ball on fluid. Cover with watch glass and tape to panel to prevent movement. Place test panels in 100° F. (about 38° C.) convection oven for 24 hours and wash with soap and water at end of test. Perform adhesion test immediately after cleaning and rate for defects after 24 hours.
Corrosion test - ASTM B117 (168 hours)
Mar test uses an Atlas crockmeter type CM-5 or similar with 9 micron paper.
9 micron paper is supplied by 3M Company - part# 51144
Carwash test is performed using an Amtec Kistler carwash machine. The test solution consists of 30. g Sikron SH200 grit/20 liters water and is delivered with a flow rate of 2.1-2.3 liters/min.
QUV test - ASTM D4587 cycle 4 (720 hours)
Black basecoat - Commercially available from PPG Industries, Inc. - Product code SAC61120C
White basecoat - Commercially available from PPG Industries, Inc. - Product code SAC60519C
Test panels - Commercially available from ACT Test Panels, LLC. - Product code APR44049

Examples 7-8

Preparation of Coating Compositions

Coating compositions were formulated using the ingredients and amounts listed in Table 4. These coating compositions were prepared in a manner similar to that described above with respect to Examples 1-6 except that, in these Examples, components 1 to 7 were mixed until dissolved and homogeneous. The remaining components were added in order with agitation and mixed until clear and homogeneous. The viscosity adjustment for example 7 was made with methyl amyl ketone. All other procedures were the same as Examples 1-6.

TABLE 4

| Component | Raw material | Example #7 | Example #8 |
|---|---|---|---|
| 1 | Ethyl Acetate | — | 5.3 |
| 2 | Methyl Acetate | 6.87 | — |
| 3 | Solvesso 150 | — | 7.6 |
| 4 | Methyl Amyl Ketone | 11.51 | — |
| 5 | n-Amyl Acetate | — | 16.2 |
| 6 | CAB 551-0.01 | 3.03 | 2.33 |
| 7 | Ciba Tinuvin 928 | 0.60 | 0.46 |
| 8 | Ciba Tinuvin 123 | 0.73 | 0.56 |
| 9 | Sartomer CN2922 | — | 8.80 |
| 10 | Sartomer CN966A80 | — | 8.80 |
| 11 | Sartomer SR833S | 8.81 | — |
| 12 | Sartomer CN2920 | 27.75 | 14.16 |
| 13 | Sartomer SR399 | 8.81 | 8.03 |

TABLE 4-continued

| Component | Raw material | Example #7 | Example #8 |
|---|---|---|---|
| 14 | Sartomer NTX11374 | 9.63 | 7.41 |
| 15 | Bomar BMA250 | 18.09 | 13.92 |
| 16 | K-Cure 129B | 1.24 | 0.96 |
| 17 | Triphenyl Phosphite | 0.11 | 0.08 |
| 18 | Darocur ® 1173 | 1.33 | 0.25 |
| 19 | Genocure MBF | 0.55 | 0.42 |
| 20 | Irgacure ® 184 | 0.55 | 0.77 |
| 21 | Darocur ® 4265 | — | 0.15 |
| 22 | Irgacure 819 | 0.13 | — |
| 23 | BYK-310 | — | 0.06 |
| 24 | BYK-378 | 0.025 | — |
| 25 | Aerosil R812S | — | 3.80 |

Component 2/CAS # 72-20-9/supplied by Eastman Chemical
Component 4/CAS # 110-43-0/supplied by Dow Chemical
Component 11/CAS # 60506-81-2/supplied by Sartomer
Component 22/CAS # 162881-26-7/supplied by Chitech Chemical Co.
Component 24/CAS # CERT LTR/supplied by BYK Chemical Test Substrates A powder clearcoat (PCC10155) was applied and cured over a thermoset basecoat using a 4"×12" test panel (APR44049 supplied by ACT Test Panels LLC), according to the paint manufactures specifications. Next a black thermoplastic basecoat prepared in accordance with the paint manufactures specifications was applied to the test panel using a Paasche model H #5 airbrush. The thermoplastic basecoat film thickness in these examples was in the 0.3 to 0.6 mil range. The UV clearcoat of Examples 7 and 8 were applied over the test panel using an Electrostatic Bell application and cured as described in paragraph [0085]. After the panel was cured, a visual evaluation was performed to look for any cracking over the touch up basecoat area and a 2-3 inch long X scribe using a razor or scalpel was cut through the touch up basecoat and all underlying coatings down to the metal substrate. Results are shown in Table 5.

TABLE 5

| | Tg (° C.) | Crosslink density (mmoles/cm$^2$) | Visual crack rating |
|---|---|---|---|
| Example #8 | 84 | 10 | Pass |
| Example #7 | 126 | 25 | Fail |

Example 9

A series of photoinitiator (PI) combinations were tested using the following basemix formula, as shown in Table 6, to compare the amount of yellowing over a commercially available white basecoat in conjunction with a commercially available powder clear coat (PCC). The basemix formulation of Table 6 was prepared in the same manner as described in with respect to Examples 1-6. The same basemix was added to individual containers and the photoinitiator compositions of Table 7 were added and mixed until dissolved and homogeneous.

TABLE 6

| Component number | Raw material | Basemix 1 |
|---|---|---|
| 1 | Ethyl Acetate | 4.91 |
| 2 | Solvesso 150 | 7.04 |
| 3 | n-Amyl Acetate | 16.89 |
| 4 | CAB 551-0.01 | 2.17 |
| 5 | Ciba Tinuvin 928 | 0.43 |
| 6 | Ciba Tinuvin 123 | 0.52 |
| 7 | Sartomer CN2922 | 16.33 |
| 8 | Sartomer CN2920 | 13.14 |
| 9 | Sartomer SR399 | 8.52 |
| 11 | Sartomer NTX11374 | 8.52 |
| 11 | Bomar BMA250 | 15.98 |
| 12 | K-Cure 129B | 1.10 |
| 13 | Triphenyl Phosphite | 0.08 |
| 14 | BYK-310 | 0.05 |
| 15 | Aerosil R812S | 2.24 |

TABLE 7

| Raw material | Ex. 9A | Ex. 9B | Ex. 9C | Ex. 9D | Ex. 9E |
|---|---|---|---|---|---|
| Basemix 1 | 98.4 | 98.4 | 98.4 | 98.4 | 98.4 |
| Darocur ® 1173 | 0.94 | 0.94 | 0.23 | | |
| Genocure MBF | 0.39 | 0.39 | 0.39 | 0.39 | 0.39 |
| Irgacure ® 184 | 0.39 | 0.39 | 0.71 | 0.94 | 1.33 |
| Irgacure ® 819 | 0.09 | | | | |
| Esacure ® one | | 0.07 | | | |
| Darocur ® 4265 | | 0.07 | 0.09 | 0.09 | 0.09 |

Test Substrates

A series 4"×12" test panels with a commercially available white thermoset basecoat and powder clearcoat were prepared and cured according to the paint manufactures specifications. The UV clearcoat test examples from Table 7 were applied over the test panels using a drawdown bar with a target filmbuild of 2.0 mils (50 microns) and cured as described in paragraph [0085]. The UV clearcoat film thickness was measured and an area of 1.8-2.0 mils (45-50 microns) was selected to perform color measurements approximately 48 hours after cure. Results are set forth in Table 8.

TABLE 8

| Test | Ex. 9A | Ex. 9B | Ex. 9C | Ex. 9D | Ex. 9E | PCC 10155 (~3.5 mils) | PCC 10155 - 2 coats (~7.0 mils) |
|---|---|---|---|---|---|---|---|
| Color B value | −0.67 | −1.049 | −1.158 | −1.08 | −0.822 | −2.526 | −0.408 |
| Brake fluid test rank - Ranked 1 to 5 (lower is better) | 3 | 2.5 | 2.5 | 2.5 | 2.5 | 5 | 5 |

TABLE 8-continued

| Test | Ex. 9A | Ex. 9B | Ex. 9C | Ex. 9D | Ex. 9E | PCC 10155 (~3.5 mils) | PCC 10155 - 2 coats (~7.0 mils) |
|---|---|---|---|---|---|---|---|
| Humidity test rank - Ranked 1 to 5 (lower is better) | 3 | 3 | 1.5 | 2.5 | 1.5 | 1.5 | 1.5 |

Color - ASTM D1729
Visual brake fluid test looks for overall damage (i.e. swelling, discoloration, etching, etc.) caused by Dot 4 brake fluid - Lower is better.
7 days @ 100° F. visual humidity test looks for precipitate that forms on the surface which may be residual unreacted materials. This precipitate can be washed or wiped off of the test panel. Lower is better.
White thermoset basecoat - Commercially available from PPG Industries, Inc. - Product code SAC60519C
Powder clearcoat - Commercially available from PPG Industries, Inc. - Product code PCC10155
Test panels - Commercially available from ACT Test Panels, LLC. - Product code APR44049

Examples 9A-9E were compared to the PCC10155 powder system at 3.5 mils as a control for yellowing. Yellowing was measured using the B value to quantify the color space between blue and yellow. The PCC 10155 has a measured B value of −2.526 and the closest system was Example 9C. Examples 9C also showed the best overall performance for brake fluid and humidity resistance.

Example 10

A modification of Example #5 from Table 1 was prepared to improve the appearance of a commercially available silver thermoplastic basecoat. This application represents a touch-up area which may occur in an automotive or motor vehicle type environment to repair defects of a finished part.

A series of thermoset basecoat panels, silver and/or black, with a powder clearcoat (PCC10155) were prepared and cured according to the manufacture's specifications. A silver thermoplastic basecoat was applied as a spot repair as described in the crack test procedure. The silver basecoat film thickness was approximately 0.3-0.5 mils in the bulk and decreased to <0.1 mils in the blend in area. Blend in is a feathering technique performed with an airbrush, or similar spray gun apparatus, to better match color and decrease the effect of a dramatic color shift between the two paint systems. The clearcoat was applied to the entire panel using a Bell Electrostatic spray application with a target DPT of 1.7-2.0 mils and cured as described in paragraph [0085]. The results are summarized in Table 9.

TABLE 9

| Clearcoat | Thermoplastic basecoat | 20° gloss | DOI | Overall visual appearance |
|---|---|---|---|---|
| Example # 5 | Pewter silver (50:50 w/DT870 reducing solvent) | 86 | 41 | Hazy/soak-in look |
| 100. g Example # 5 + 0.50 g Vazo ®-88 | 100. g Pewter silver (50:50 w/DT870 reducing solvent) + 1.5 g Triisopropyl borate/1.25 g CN2920/0.25 g Vazo-88 | 87 | 89 | Clear and bright |
| 100. g Example # 5 + 0.50 g Vazo ®-88 | 100. g Pewter silver (50:50 w/DT870 reducing solvent) + 1.5 g Triisopropyl borate/0.25 g Vazo-88 | 86 | 84 | Clear and bright |

Gloss - ASTM D523
DOI - ASTM D5767
Triisoproply borate - CAS# 5419-55-6 - Commercially available from Anderson Development Co. - Product name Almabor TIPB
Pewter silver - Commercially available from PPG Industries, Inc. - Product code Deltron DBC 5682
Reducing solvent - Commercially available from PPG Industries, Inc. - Product code DT870

Example 11

A modification of Example #5 from Table 1 was prepared to improve the adhesion over a commercially available white thermoplastic basecoat. This application represents a touch-up area which may occur in an automotive or motor vehicle type environment to repair defects of a finished part.

A series of white thermoset basecoat panels with a powder clearcoat (PCC10155) were prepared and cured according to the manufacture's specifications. A white thermoplastic basecoat was applied as described in the crack test procedure. The thermoplastic basecoat was applied at approximately 0.5-0.7 mils along with a blend in area of <0.1 mils. The UV clearcoat was applied to the entire panel using a drawdown bar with a film thickness of approximately 2.0 mils and cured as described in paragraph [0085]. The results are summarized in Table 10.

TABLE 10

| Clearcoat | Thermoplastic basecoat | Adhesion |
|---|---|---|
| Example # 5 | White thermoplastic basecoat (50:50 w/DT870 reducing solvent) | 0% adhesion |
| 100 g Example # 5 + 1.0 g Vazo ®-67 | 100. g White thermoplastic basecoat (50:50 w/DT870 reducing solvent) + 3.0 g Triisopropyl borate | 100% adhesion |

Adhesion test - ASTM D3359
White thermoplastic basecoat - Commercially available from PPG Industries, Inc. - Product code Deltron D990

Incorporation of triisopropyl borate in the white basecoat improved the adhesion of the basecoat to the powder clearcoat.

Whereas particular embodiments of this invention have been described above for purposes of illustration, it will be evident to those skilled in the art that numerous variations of the details of the present invention may be made without departing from the invention as defined in the appended claims.

We claim:
1. A dual cure coating composition comprising:
   (a) a melamine-group containing polyethylenically unsaturated compound; and
   (b) an acrylate-containing composition comprising:
      (i) a urethane acrylate,
      (ii) an epoxy acrylate, and
      (iii) a multi-functional acrylate monomer;
   wherein the acrylate-containing composition (b) is present in the dual cure coating composition at a level sufficient to provide a cured coating layer deposited from the coating composition having a glass transition temperature (Tg) of 100° C. or below and a crosslink density of 20.0 mmoles/cc or below, and
   wherein the dual cure coating composition is curable by exposing the coating composition to thermal energy followed by radiation wherein the urethane acrylate comprises a polycarbonate urethane acrylate and a polyester urethane acrylate.

2. The dual cure coating composition of claim 1, wherein the polyester urethane acrylate comprises more than one polyester urethane acrylate, wherein at least one of the polyester urethane acrylates comprises tripropylene glycol diacrylate.

3. The dual cure coating composition of claim 1, wherein the multi-functional acrylate monomer comprises a pentaacrylate monomer.

4. The dual cure coating composition of claim 1, wherein the acrylate-containing compound (b) is present in the dual cure coating composition at a level sufficient to provide a cured coating layer deposited from the coating composition having a glass transition temperature (Tg) of 90° C. or below and a crosslink density of 15.0 mmoles/cc or below.

5. The dual cure coating composition of claim 1, wherein (b) comprises a compound containing groups reactive with the melamine groups of the melamine-group containing polyethylenically unsaturated compound (a).

6. The dual cure coating composition of claim 1, wherein the melamine-group containing polyethylenically unsaturated compound (a) is present from about 5 to 45 weight percent based on the total resin solids of the coating composition.

7. The dual cure coating composition of claim 1, further comprising (c) a photoinitiator composition comprising:
   (a) a photoinitiator having a maximum absorbance with a molar extinction coefficient of from $1 \times 10^{3.80}$ to $1 \times 10^{4.20}$ (L mol$^{-1}$cm$^{-1}$) within a wavelength range of 240 to 250 nanometers;
   (b) a photoinitiator having a maximum absorbance with a molar extinction coefficient of from $1 \times 10^{3.85}$ to $1 \times 10^{4.25}$ (L mol$^{-1}$cm$^{-1}$) within a wavelength range of 250 to 260 nanometers; and
   (c) a photoinitiator having a molar extinction coefficient greater than $1 \times 10^2$ (L mol$^{-1}$cm$^{-1}$) at a wavelength of 380 nanometers.

8. The dual cure coating composition of claim 1, further comprising (c) a free radical initiator present between about 1.0 and 2.0 weight percent of the total weight of the dual cure coating composition.

9. A radiation curable coating composition comprising:
   (a) a radiation curable coating compound; and
   (b) a photoinitiator composition comprising;
      (i) a photoinitiator having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers;
      (ii) a photoinitiator having a maximum absorbance with a molar extinction coefficient of from $1 \times 10^{3.85}$ to $1 \times 10^{4.25}$ (L mol$^{-1}$ cm$^{-1}$) within a wavelength range of 250 to 260 nanometers; and
      (iii) a photoinitiator having a molar extinction coefficient greater than $1 \times 10^2$ (L mol$^{-1}$cm$^{-1}$) at a wavelength of 380 nanameters:
   wherein the photoinitiator of (b)(i) comprises:
      (x) a photonitiator having a maximum absorbance with a molar extinction coefficient of from $1 \times 10^{3.80}$ to $1 \times 10^{4.20}$ (L mol$^{-1}$cm$^{-1}$) within the wavelength range of 240 to 250 nanometers and a boiling point at atmospheric pressure of greater than 200° C.; and
      (y) a photonitiator having a maximum absorbance with a molar extinction coefficient of from $1 \times 10^{3.80}$ to $1 \times 10^{4.20}$ (L mol$^{-1}$) within the wavelength range of 240 to 250 nanometers and a boiling point at atmospheric pressure of no more than 90° C.;
   wherein the weight ratio of (a) to (b) in the coating comoposition is from 2:1 to 3:1.

10. The coating composition of claim 9, wherein the radiation curable compound comprises a melamine-group containing poiyethylenically unsaturated compound.

11. The coating composition of claim 9, wherein the coating composition comprises:
   (a) at least 0.1 up to 5 percent by weight of free radical photoinitiator(s) having a maximum absorbance with a molar extinction coefficient of from $1 \times 10^{3.80}$ to $1 \times 10^{4.2}$(L mol$^{-1}$ cm$^{-1}$) within a wavelength range of 240 to 250 nanometers;
   (b) at least 0.1 up to 2 percent by weight of free radical photoinitiator a photoinitiator having a maximum absorbance with a molar extinction coefficient of from $1 \times 10^{3.85}$ to $1 \times 10^{4.25}$(L cm$^{-1}$cm$^{-1}$) within a wavelength range of 250 to 260 nanometers; and
   (c) at least 0.01 up to 1 percent by weight of free radical photoinitiator having a molar extinction coefficient greater than $1 \times 10^2$ (L mol$^{-1}$ cm$^{-1}$) at a wavelength of 380 nanometers,
   such weights percent being based on the total weight of the composition.

12. The coating composition of claim 11, wherein the coating composition comprises:
   (a) at least 0.8 up to 1.2 percent by weight of free radical photoinitiator(s) having a maximum absorbance with a molar extinction coefficient of from $1 \times 10^{3.80}$ to $1 \times 10^{4.20}$ (L mol$^{-1}$ cm$^{-1}$) within a wavelength range of 240 to 250 nanometers;
   (b) at least 0.4 up to 0.6 percent by weight of free radical photoinitiator a photoinitiator having a maximum absorbance with a molar extinction coefficient of from $1 \times 10^{3.85}$ to $1 \times 10^{4.25}$ (L mol$^{-1}$ cm$^{-1}$) within a wavelength range of 250 to 260 nanometers; and
   (c), at least 0.05 up to 0.1 percent by weight of free radical photoinitiator having a molar extinction coefficient greater than $1 \times 10^2$ (L mol$^{-1}$ cm$^{-1}$) at a wavelength of 380 nanometers,
   such weights percent being based on the total weight of the composition.

13. The dual cure coating composition of claim 1, wherein exposing to thermal energy occurs for no more than 10 minutes.

14. The dual cure coating composition of claim 1, wherein exposing to thermal energy provides a dual cure coating temperature of 80-120° C.

* * * * *